US011289827B2

(12) United States Patent
Marmet et al.

(10) Patent No.: US 11,289,827 B2
(45) Date of Patent: Mar. 29, 2022

(54) ELECTRICAL HARNESS FOR A TURBOMACHINE

(71) Applicant: SAFRAN AIRCRAFT ENGINES, Paris (FR)

(72) Inventors: Eric Maurice Daniel Marmet, Moissy-Cramayel (FR); Clément Pierre Bernard Audoux, Moissy-Cramayel (FR); Victorin Machado, Moissy-Cramayel (FR); Jocelyn Jean Romolo Pages, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/058,971

(22) PCT Filed: May 24, 2019

(86) PCT No.: PCT/FR2019/051210
§ 371 (c)(1),
(2) Date: Nov. 25, 2020

(87) PCT Pub. No.: WO2019/224502
PCT Pub. Date: Nov. 28, 2019

(65) Prior Publication Data
US 2021/0218159 A1 Jul. 15, 2021

(30) Foreign Application Priority Data
May 25, 2018 (FR) .................................. 1854464

(51) Int. Cl.
*H01R 9/05* (2006.01)
*H01R 4/20* (2006.01)
(Continued)

(52) U.S. Cl.
CPC ............... *H01R 4/20* (2013.01); *H01R 4/183* (2013.01); *B64D 27/10* (2013.01); *B64D 27/16* (2013.01); *H01R 4/58* (2013.01); *H01R 4/72* (2013.01)

(58) Field of Classification Search
CPC .............................. H01R 9/05; H02G 3/0406
See application file for complete search history.

(56) References Cited

U.S. PATENT DOCUMENTS 3,801,730 A * 4/1974 Nakata ................. H02G 15/184
174/73.1
3,872,237 A * 3/1975 Eyre ....................... H01P 1/045
174/88 C
(Continued)

FOREIGN PATENT DOCUMENTS

DE 10 2005 054926 A1 6/2006
EP 1 443 620 A1 8/2004
(Continued)

OTHER PUBLICATIONS

International Patent Application No. PCT/FR2019/051210, International Search Report and Written Opinion dated Oct. 9, 2019, 9 pgs.
(Continued)

*Primary Examiner* — Chau N Nguyen
(74) *Attorney, Agent, or Firm* — Lathrop GPM LLP

(57) ABSTRACT

The present invention relates to an electrical harness (1) comprising at least one first cable strand (2) and at least one second cable strand (3, 4), which are respectively at least partially surrounded externally by a first shielding braid (13) and a second shielding braid (14, 15), and a connecting socket (16) externally surrounding one end of the first cable strand (17) and one end of the second cable strand (18, 19), characterised in that the connecting socket (16) comprises a fixing part (21) intended to be engaged on a fixing member of the turbomachine, and a crimping part (20), the ends (26, (Continued)

27, 28) of the first (13) and second (14, 15) shielding braids being engaged externally to the crimping part (20), at least one crimping member (32) holding said ends (26, 27, 40) on the crimping part (20).

15 Claims, 2 Drawing Sheets

(51) Int. Cl.
  *H01R 4/18*   (2006.01)
  *B64D 27/10*  (2006.01)
  *B64D 27/16*  (2006.01)
  *H01R 4/58*   (2006.01)
  *H01R 4/72*   (2006.01)

(56) References Cited

U.S. PATENT DOCUMENTS

| | | | | |
|---|---|---|---|---|
| 4,810,832 A | * | 3/1989 | Spinner | H01R 13/5205 174/654 |
| 9,887,529 B2 | * | 2/2018 | Dew | B60R 16/0222 |
| 10,297,364 B2 | * | 5/2019 | Izawa | H02G 3/0481 |
| 2008/0264669 A1 | * | 10/2008 | Bedingfield | G02B 6/4459 174/97 |
| 2013/0248246 A1 | * | 9/2013 | Oga | B60R 16/0207 174/72 A |

FOREIGN PATENT DOCUMENTS

| | | |
|---|---|---|
| EP | 1 858 116 A1 | 11/2007 |
| FR | 2 937 471 A1 | 4/2010 |
| KR | 2011 0135031 A | 12/2011 |

OTHER PUBLICATIONS

French Patent Application No. 1854464; Search Report dated Jan. 24, 2019; 6 pages.

* cited by examiner

ELECTRICAL HARNESS FOR A TURBOMACHINE

CROSS-REFERENCE TO RELATED APPLICATIONS

This application is a 35 U.S.C. § 371 filing of International Application No. PCT/FR2019/051210 filed May 24, 2019, which claims the benefit of priority to French Patent Application No. 1854464 filed May 25, 2018, each of which is incorporated herein by reference in its entirety.

FIELD OF THE INVENTION

The present invention concerns an electrical harness in particular for aeronautics and more particularly intended to be mounted in a turbomachine such as a turbojet or turboprop engine of an aircraft.

BACKGROUND OF THE INVENTION

Reducing the dimensions of turbomachinery requires finding electrical harness solutions whose dimensions and characteristics allow them to be mounted in restricted spaces.

In addition, there is a need to develop electrical harnesses that can withstand high temperatures, while being compact and lightweight.

In order to reduce the mass of electrical harnesses, lighter, heat-shrinkable synthetic material-based protective sheath technologies can be used in areas where thermal stresses are lower and within a given temperature range, e.g. below 210° C.

It is also known to use braided stainless steel sheaths, capable of withstanding high temperatures, especially above 210° C.

The transition between a stainless steel sheath and a synthetic sheath can be provided in a zone of the harness comprising in particular a so-called transition part. It can also be used to secure the harness to a fixed part of the turbomachine. Such an attachment is for example achieved by inserting said part into an elastic clip.

In addition, electrical harnesses usually have branching points, where a single strand of wire is split into several strands of wire. This can be done in an area of the harness with a so-called bypass part. The latter is separate from the transition part and is located either downstream or upstream of the transition part. Said bypass part may also include an area for attaching the harness to a fixed part of the turbomachine.

The areas where the harness is attached to the fixed parts of the turbomachine may also have defects in shape, due to their structure. These defects in shape make it more difficult to install them on the turbomachine.

The use of two separate bushings increases the size and weight of the harness, making it difficult to integrate such a harness into a small turbomachine.

Cables and strands of electrical cables are also externally surrounded by an electromagnetic shielding sheath. In addition to the above-mentioned constraints, continuity of such shielding must be ensured at the transition and branch parts.

The invention is intended to remedy all or part of the above-mentioned disadvantages in a simple and economic manner.

SUMMARY OF THE INVENTION

For this purpose, the present invention relates to an electrical harness comprising at least one first cable strand and at least one second cable strand, which are respectively at least partially surrounded externally by a first shielding braid and a second shielding braid, and a connecting socket externally surrounding one end of the first cable strand and one end of the second cable strand, characterised in that the connecting socket comprises a fixing part intended to be engaged on a fixing member of the turbomachine, and a crimping part, the ends of the first and second shielding braids being engaged externally to the crimping part, at least one crimping member holding said ends on the crimping part.

The connecting socket combines the fixing and crimping function of the shielding braids into a single rigid, one-piece element. The crimping part is therefore sufficiently rigid to allow the shielding braids to be crimped with the crimping tool. Such a crimp guarantees the electrical continuity of the shielding.

In addition, the shape of the attachment part can be fixed, e.g. cylindrical, so as to facilitate mounting and angular positioning of the harness on the relevant part of the turbomachine.

Shielding braids can be made of braided material, e.g. copper-nickel based alloy.

The connecting socket can be made of metal, for example.

The harness may consist of a single first strand of wire and several second strands of wire, e.g. two or more second strands of wire.

In addition, the end of the first or second shielding braid can be inserted into the connecting socket and can be folded back through 180° outside the crimping part, whereby the end of the second or first shielding braid can only be inserted outside the crimping part.

In other words, the end of the second or first shielding braid does not pass through the connecting socket.

Each cable strand may be at least partially surrounded externally by a first protective braid, with the first protective braids overlapping in an overlapping area.

The first protective braids can be textile sheaths.

The first protective braids are, for example, made of meta-aramid.

The first protective braids can be sewn together in the overlap area.

The shielding braids can be wrapped externally around the first protective braids.

Each cable strand may be at least partially surrounded externally by a second protective sheath.

The second protection tubes can be made of heat-shrinkable synthetic material, e.g. a material marketed under the brand name VITON® by the DuPont de Nemours company. Heat-shrinkable synthetic materials are lightweight and can withstand temperatures up to 210° C. The second protection tubes can also be made of stainless materials, which can withstand temperatures up to 260° C.

The end of the second protective sheath of one of the cable strands can be mounted externally to the crimping part and externally to the crimped ends of the shielding braids.

Said end of the second protective sheath can be fixed by crimping externally to the crimping part using the crimping member.

The second protective sheaths may at least partially externally surround the shielding braids.

The internal volume of the connecting socket is filled at least partially with a resin embedding the cables, the shielding braid and/or the protective sheaths.

The invention also relates to a turbomachine, such as a turbojet or turboprop for an airplane, characterised in that it comprises an electrical harness of the above-mentioned type.

The invention will be better understood and other details, characteristics and advantages of the invention will appear when reading the following description, which is given as a non-limiting example, with reference to the attached drawings.

DETAILED DESCRIPTION

Figure 1:
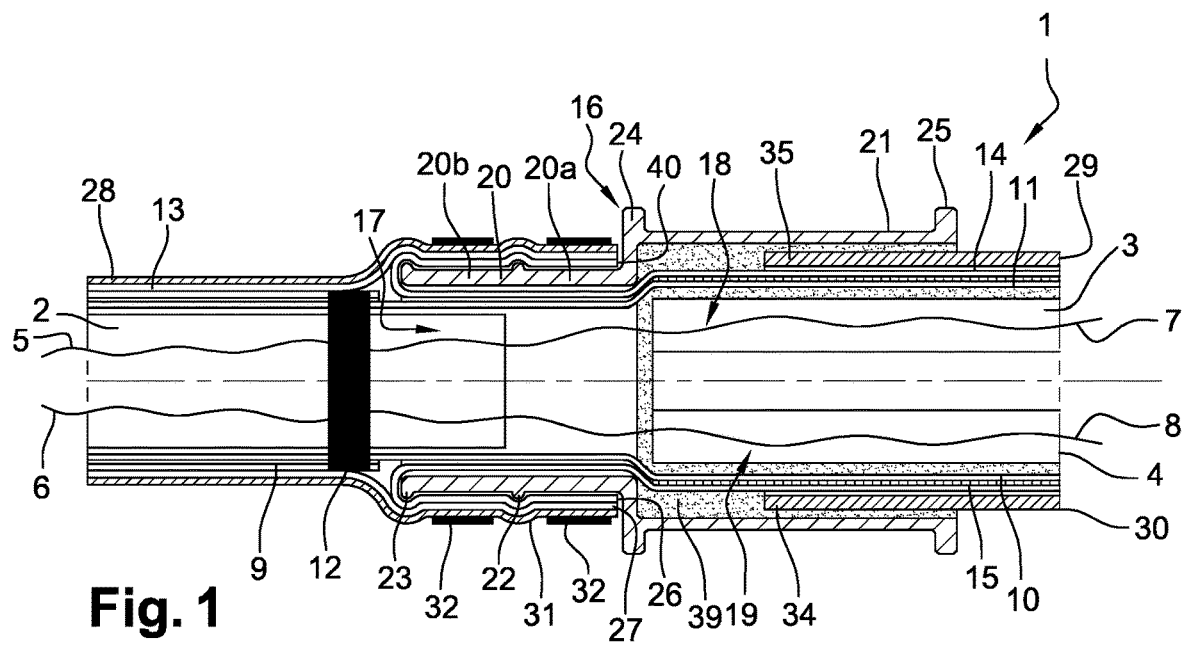
FIG. 1 is a schematic sectional view of an electrical harness according to one embodiment of the invention.

FIG. 1 shows a part of a harness 1 according to a first embodiment of the invention. The harness consists of a first strand of cables 2 and two second strands of cables 3, 4, which are intended to supply power to components of the turbomachine from a source, or to transfer electrical signals between components. Each cable has at least one electrical conductor. Each electrical conductor 5, 6 of the first cable is branched into the second cable strands 3, 4 consisting of electrical conductors 7, 8.

The first cable strand 2 and every second cable strand 3, 4 are externally surrounded by a first textile protective braid. The first protective braid 9 of the first cable strand 2 and the first protective braids 10, 11 of the second cable strands 3, 4 are sewn together in an overlap area 12. The overlap area 12 is located outside the first cable strand 2.

For example, the first protective braids 9, 10, 11 are made of a synthetic material of the meta-aramid type.

A first electromagnetic shielding braid 13 externally surrounds the first cable strand 2 and the first protective braid 9. Similarly, each of the second cable strands 3, 4 and their respective first protective braids 10, 11 are surrounded externally by a second electromagnetic shielding braid 14, 15. Shielding braids 13, 14, 15 are braided sleeves made of a copper and nickel-based alloy.

Figure 2:
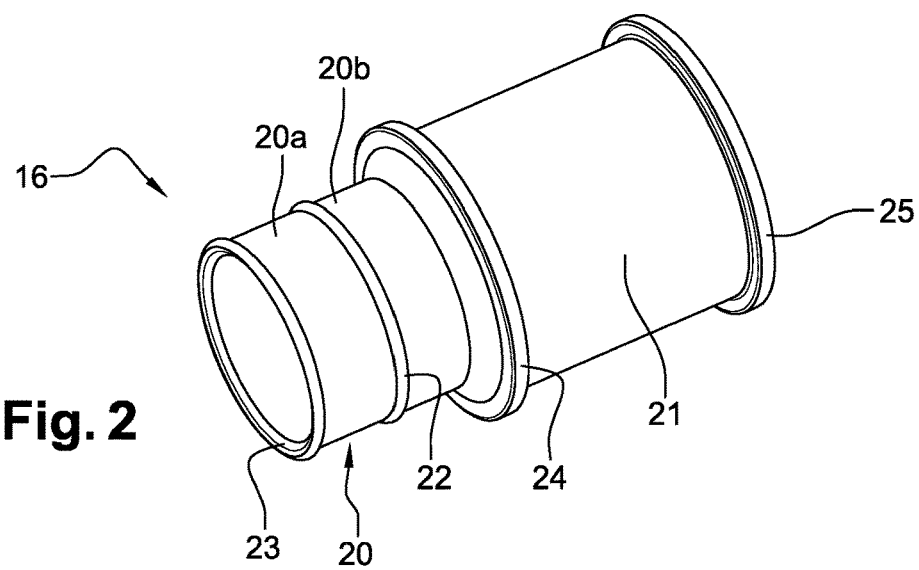
FIG. 2 is a schematic view of the connecting socket.

A connecting socket 16, best seen in FIG. 2, externally surrounds one end 17 of the first strand of wire 2 and ends 18, 19 of the second strands of wire 3, 4.

The connecting socket 16 is rigid and consists of a cylindrical crimping part 20 and a cylindrical fixing part 21, which has a larger diameter than the crimping part.

The crimping part 20 has two cylindrical areas 20a, 20b spaced from each other by a first annular flange 22 and has at its end a second annular flange 23. The fixing part has two annular flanges 24, 25 located at its ends.

The connecting socket 16 can be made of metal, e.g. stainless steel or titanium, or synthetic material, e.g. glass-filled resin.

Ends 27, 26, 40 of the first 13 and second 14, 15 shielding braids are engaged externally to the crimp part 20 of the connecting piece 16. The second shielding braids 14, 15 are engaged in the connecting socket 16 and are folded over externally at the crimping part 20, making a 180° return. In other words, the second shielding braids 14, 15 pass through the connecting socket 16 and are bent in such a way that ends 26, 40 of these shielding braids externally surround the outer surface of the crimp part 20. The first shielding braid 13 does not pass through bushing 16 and its end 27 is engaged externally to crimp part 20.

A second protective sheath 28, 29, 30 surrounds externally each cable strand, the first protective braids and the corresponding shielding braids. The second protection sheaths can be made of heat-shrinkable synthetic material, for example a material marketed under the brand name VITON® by the DuPont de Nemours company, or of braided stainless steel.

One end 31 of the second protective sheath 28 of the first cable strand 2 is mounted externally to the crimp part 20 and externally to the corresponding ends 27, 26, 40 of the shielding braids. These ends 31, 26, 27, 40 are attached by crimping externally to the rigid crimping part 20 using crimping collars 32. A crimping collar 32 is mounted at each zone 20a and 20b. The rigidity of the crimping part 20 prevents it from deforming when tightening the crimping tool 32.

Figure 4:
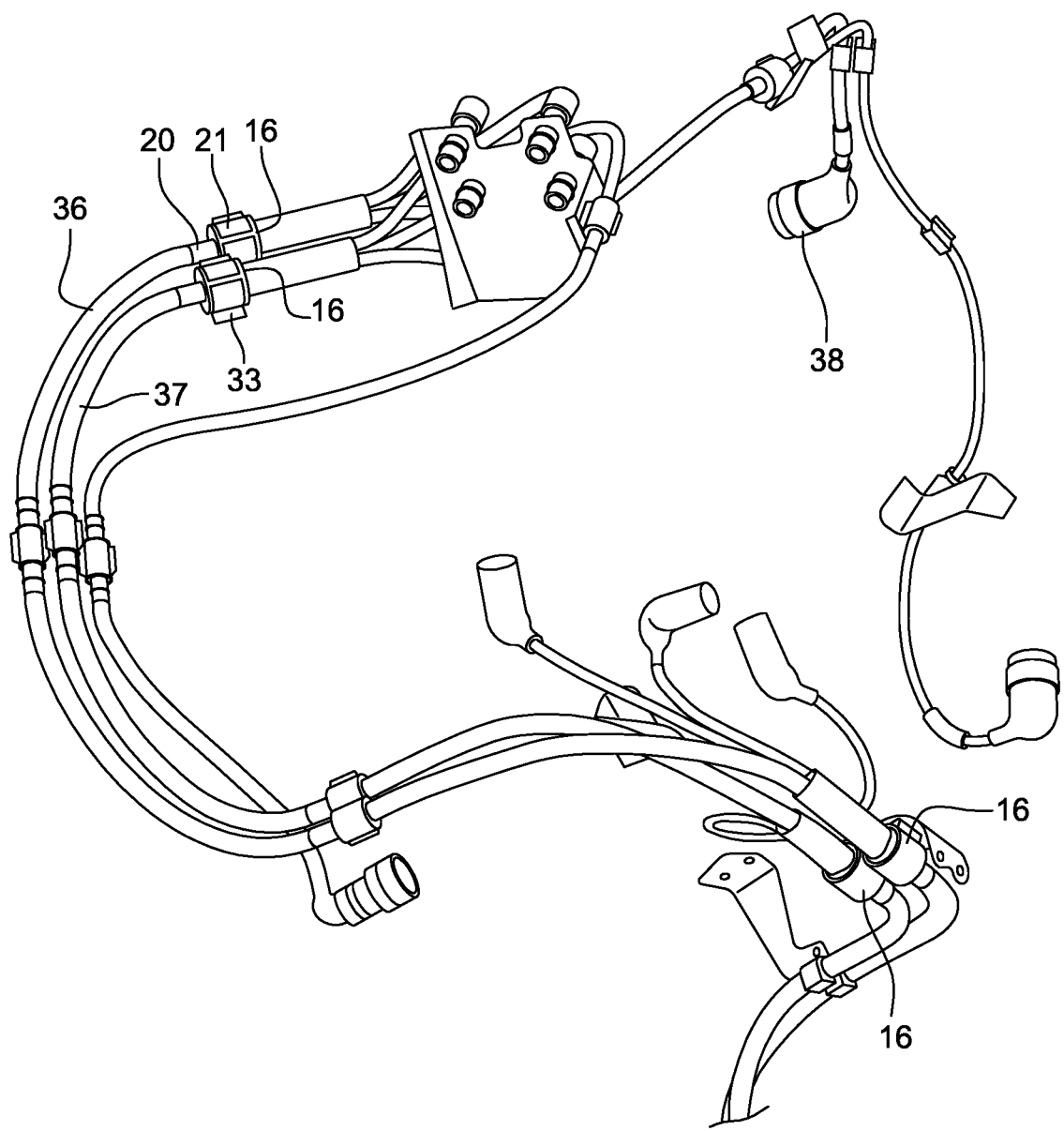
FIG. 4 is a perspective view of parts of the harness according to the invention, fixed by means of fasteners.

In addition, the fastening part 21 is intended to be inserted into a fastening element of the turbomachine, e.g. a fastening clip 33 (visible in FIG. 4). The rigidity of the fastening part 21 guarantees the shape of this part and thus facilitates the positioning by an operator on the fastener 33.

The corresponding ends 34, 35 of the second protective sheaths 29, 30 of the second cable strands 3, 4 are mounted inside the fixing part 21. The inner volume of the fixing part 21 is filled with a resin 39, e.g. epoxy resin, embedding the second protective sheaths 29, 30 of the second cable strands 3, 4.

The connecting socket 16 thus allows both the transition from a second stainless steel protective sheath to a second synthetic protective sheath and the branching of a cable strand into several cable strands. The use of a single bushing 16 reduces the size of the electrical harness, making it easier to integrate such a harness into a small-sized turbomachine.

The arrangement of the shielding braids 13, 14, 15 also ensures the continuity of the electromagnetic shielding at the connection socket.

Figure 3:
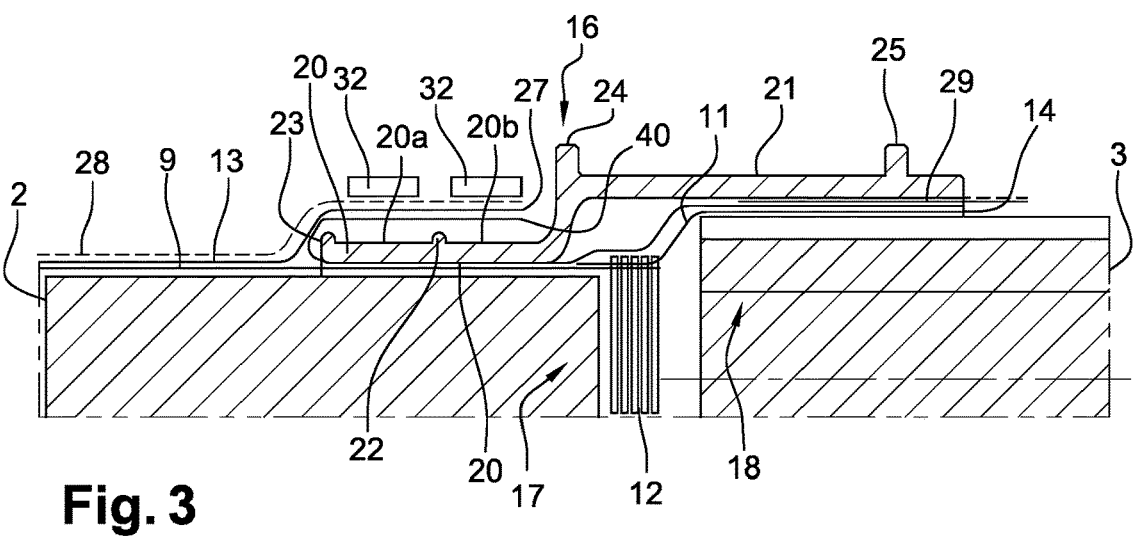
FIG. 3 is a schematic sectional half-view of an electrical harness according to another embodiment of the invention.

FIG. 3 shows a part of an electrical harness according to another embodiment of the invention. In this particular embodiment, the overlap area 12 where the first protective braids 9, 11 of the first 2 and the second cable strands 3, 4 overlap and are sewn together is located inside the fixing part 21 of the connecting socket 16.

FIG. 4 shows the mounting of two harnesses 36, 37 on fasteners 33. In particular, each harness has several connecting sockets 16 as described above. The fastening part of each connecting socket 16 is snap-fitted into a fastener 33. In particular, each fastener 33 has a clip shape consisting of two elastically deformable legs, as is known per se. Each fastener 33 may itself be attached to a fixed part of the turbomachine. Fastener 33 can also be a clamp with a silicone sheath.

Each harness 36, 37 also includes connectors 38 that can be connected to components of the turbomachine.

The invention claimed is:

1. Electrical harness for a turbomachine, having at least one first cable strand and at least one second cable strand, which are respectively at least partially surrounded on the outside by a first shielding braid and a second shielding braid, and having a connecting socket surrounding externally one end of the first cable strand and one end of the second cable strand, characterised in that the connecting socket comprises a fixing part intended to be engaged on a fixing member of the turbomachine, and a crimping part, the ends of the first and second shielding braids being engaged externally to the crimping part, at least one crimping member holding said ends on the crimping part, the end of the first or second shielding braid being inserted into the connecting socket and being bent back through 180° outside the crimping part, the end of the second or first shielding braid being inserted only outside the crimping part;

each cable strand is at least partially surrounded externally by a first protective braid, the first protective braids overlapping in an overlapping region;

each cable strand is at least partially surrounded externally by a second protective sheath; and the end of the second protective sheath of one of the cable strands is mounted externally on the crimping part and externally on the crimped ends of the shielding braids.

2. Electrical harness according to claim 1, characterised in that the first protective braids are textile sheaths.

3. Electrical harness according to claim 2, characterised in that the first protective braids are sewn together in the overlapping area.

4. Electrical harness according to claim 3, characterised in that the shielding braids surround externally the first protective braids.

5. Electrical harness according to claim 3, characterised in that each cable strand is at least partially surrounded externally by a second protective sheath.

6. Electrical harness according to claim 3, characterised in that the inner volume of the connecting socket is at least partially filled with a resin embedding the cable strands' at least one of the first and second shielding braids' the or the second protective sheaths.

7. Electrical harness according to claim 2, characterised in that the shielding braids surround externally the first protective braids.

8. Electrical harness according to claim 2, characterised in that each cable strand is at least partially surrounded externally by a second protective sheath.

9. Electrical harness according to claim 2, characterised in that the inner volume of the connecting socket is at least partially filled with a resin embedding the cable strands' at least one of the first and second shielding braids' the or the second protective sheaths.

10. Electrical harness according to claim 1, characterised in that the shielding braids surround externally the first protective braids.

11. Electrical harness according to claim 10, characterised in that each cable strand is at least partially surrounded externally by a second protective sheath.

12. Electrical harness according to claim 10, characterised in that the inner volume of the connecting socket is at least partially filled with a resin embedding the cable strands' at least one of the first and second shielding braids' the or the second protective sheaths.

13. Electrical harness according to claim 10, characterised in that the second protective sheaths externally surround at least partially the shielding braids.

14. Electrical harness according to claim 1, characterised in that the inner volume of the connecting socket is at least partially filled with a resin embedding the cable strands, the first and second shielding braids the or the second protective sheaths.

15. Electrical harness according to claim 1, characterised in that the inner volume of the connecting socket is at least partially filled with a resin embedding the cable strands' at least one of the first and second shielding braids' r the or the second protective sheaths.

* * * * *